W. CHAPMAN.
Mowing Machine.
No. 87,244. Patented Feb. 23, 1869.
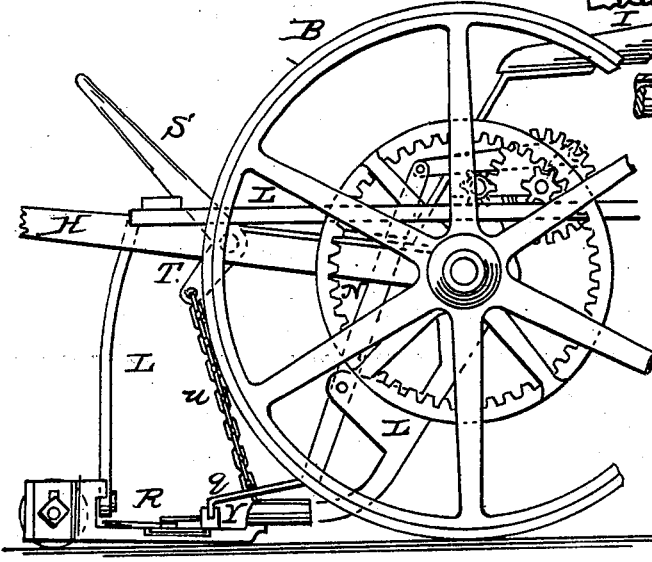

UNITED STATES PATENT OFFICE.

WALTON CHAPMAN, OF SALISBURY, CONNECTICUT, ASSIGNOR TO HIMSELF AND JOHN BARNETT, JR., OF SAME PLACE.

IMPROVEMENT IN HARVESTERS.

Specification forming part of Letters Patent No. 87,244, dated February 23, 1869.

*To all whom it may concern:*

Be it known that I, WALTON CHAPMAN, of Salisbury, in the county of Litchfield and State of Connecticut, have invented a new and useful Improvement in Mowing and Reaping Machines; and I do hereby declare that the following is a full, clear, and exact description thereof, which will enable others skilled in the art to make and use the same, reference being had to the accompanying drawings, forming part of this specification.

This invention relates to new and important improvements in machines for reaping and mowing; and it consists in operating the cutter-bar by a lever and rods from the ordinary gearing of a reaper, and in arranging the frame and parts of the machine in such a manner that the machine may pass over obstructions without interfering with its proper working, and so that the grain or grass may be cut much nearer to a stump or rock than by the ordinary machine.

In the accompanying plate of drawings, Figure 1 represents a top view of a reaper constructed according to my invention. Fig. 2 is a sectional side view. Fig. 3 is a front view with the rim of the internal gear-wheel broken away, and is a vertical section through the line $x\ x$. Figs. 4, 5, and 6 are detailed views of the wheel and ratchet, showing the snap-coupling connection, Fig. 4 being a section through the line $y\ y$ of Fig. 5, and Fig. 6 being the ratchet.

Similar letters of reference indicate corresponding parts.

The principal object which I have in view is to construct a reaper or mower in such a manner that the space between the wheels of the machine may be left clear, so that the machine may pass over obstructions which lie in its path without difficulty, and to so arrange and operate the cutter that all the grain or grass, or nearly all, may be cut around stumps and on uneven ground. For this purpose I raise the frame above the tongue and place my sickle-bar in front of the wheel, instead of behind, and operate it by means of an oscillating lever, connected with the sickle-bar and with the crank by connecting-rods, with proper attachments for raising and governing the same.

A is the axle, and B B represent the wheels. C is the internal gear. D is the clutch-coupling, and E is the shifting-lever, by which the operating parts of the machine are put in motion. L is the frame, the forward bar, G, of which passes over the pole or tongue H. I is the driver's seat, and J is the platform.

The arrangement of the driving-gears and coupling D at the left hand of the driver does not differ from that of the ordinary reaper, although the snap-coupling seen in Figs. 4, 5, and 6 is differently arranged. The ratchet K, Fig. 6, acts the part of a washer to the wheel B, or is placed on the outside of the wheel, so that the axle has a long bearing through the hub of the wheel. The frame L is supported by the axle, and extends forward for the support of the sickle-bar and the parts connected therewith, as seen in Fig. 2.

Motion is conveyed from the horizontal shaft $m$ to the sickle-bar by means of the oscillating lever N. This lever is connected with the shaft $m$ by the rod $o$ and crank P, and with the sickle-bar by means of the rod $q$ and the bell-crank or elbow R. S is a lever, by which the finger and sickle bars are raised from the ground to a vertical position without raising the frame. This lever is attached to a sleeve-lever, T. $u$ is a chain attached to this lever T, and to the shoe V. The lever S is connected with the platform J, as seen in Fig. 1. W is the sickle-bar, and X is the finger-bar, by which the sickle-bar is supported. Y is a truck-wheel on the end of the shoe.

It will be noticed that the sickle-bar operates at all times, even when in an upright position.

The levers E and S are at all times within reach of the driver, and, by the lever S, the shoe and finger and sickle bars, in passing to or from the field. The shoe is pivoted to the frame in the ordinary manner for raising or folding up the bars X W.

It will be seen that, by constructing and arranging the frame in the manner shown, it will not be obstructed by stumps, large stones, or rocks, like the machines now in use, and that, consequently, it may be used to much better advantage in the field, especially on new and uneven land.

The grain or grass may, with this machine, be cut so close to stumps and other obstructions as to render any hand-cutting after the machine unnecessary.

Having thus described my invention, I claim as new and desire to secure by Letters Patent—

1. The combination of the rod $o$, oscillating lever N, rod $q$, and bell-crank R, for conveying motion from the crank-shaft $m$ P to the sickle-bar, as herein shown and described.

2. The frame L, constructed as described, and arranged with relation to the tongue-frame, the gearing, and the axle A, substantially as described, for the purpose specified.

The above specification of my invention signed by me this 24th day of November, 1868.

WALTON CHAPMAN.

Witnesses:
    FRANK BLOCKLEY,
    ALEX. F. ROBERTS.